UNITED STATES PATENT OFFICE.

JAMES S. COCHRAN, OF PHILADELPHIA, PENNSYLVANIA, ASSIGNOR TO ANDREW COCHRAN, OF SAME PLACE.

CATTLE-FOOD.

SPECIFICATION forming part of Letters Patent No. 610,258, dated September 6, 1898.

Application filed November 17, 1897. Serial No. 658,847. (No specimens.)

*To all whom it may concern:*

Be it known that I, JAMES S. COCHRAN, a citizen of the United States, residing in the city and county of Philadelphia, State of Pennsylvania, have invented a new and useful Improvement in Food for Cattle, &c., which improvement is fully set forth in the following specification.

In carrying out my invention I take sugar-cane after all the sugar has been extracted—then commonly known as "bagasse." I then pass the same through a pickering-machine, and next bolt it and subject it to an air-draft, which separates the pith from the fibrous part of the cane or bagasse, which latter thus being divested of pith makes a nutritious food for cattle, &c., which may be used as a substitute for hay, or it may be ground and mixed with a binder, such as molasses or other sticky material, and pressed into cake form.

It will be seen that I produce a superior article of cattle-food, utilizing sugar-cane bagasse, divesting it of pith, whose absorbent nature and qualities are objectionable in food.

Having thus described my invention, what I claim as new, and desire to secure by Letters Patent, is—

As a new article of manufacture, food for cattle, &c., composed of sugar-cane bagasse, divested of pith, with or without a binder of suitable material, as above specified.

JAMES S. COCHRAN.

Witnesses:
JOHN A. WIEDERSHEIM,
ROBT. AITON.